Figure 1:
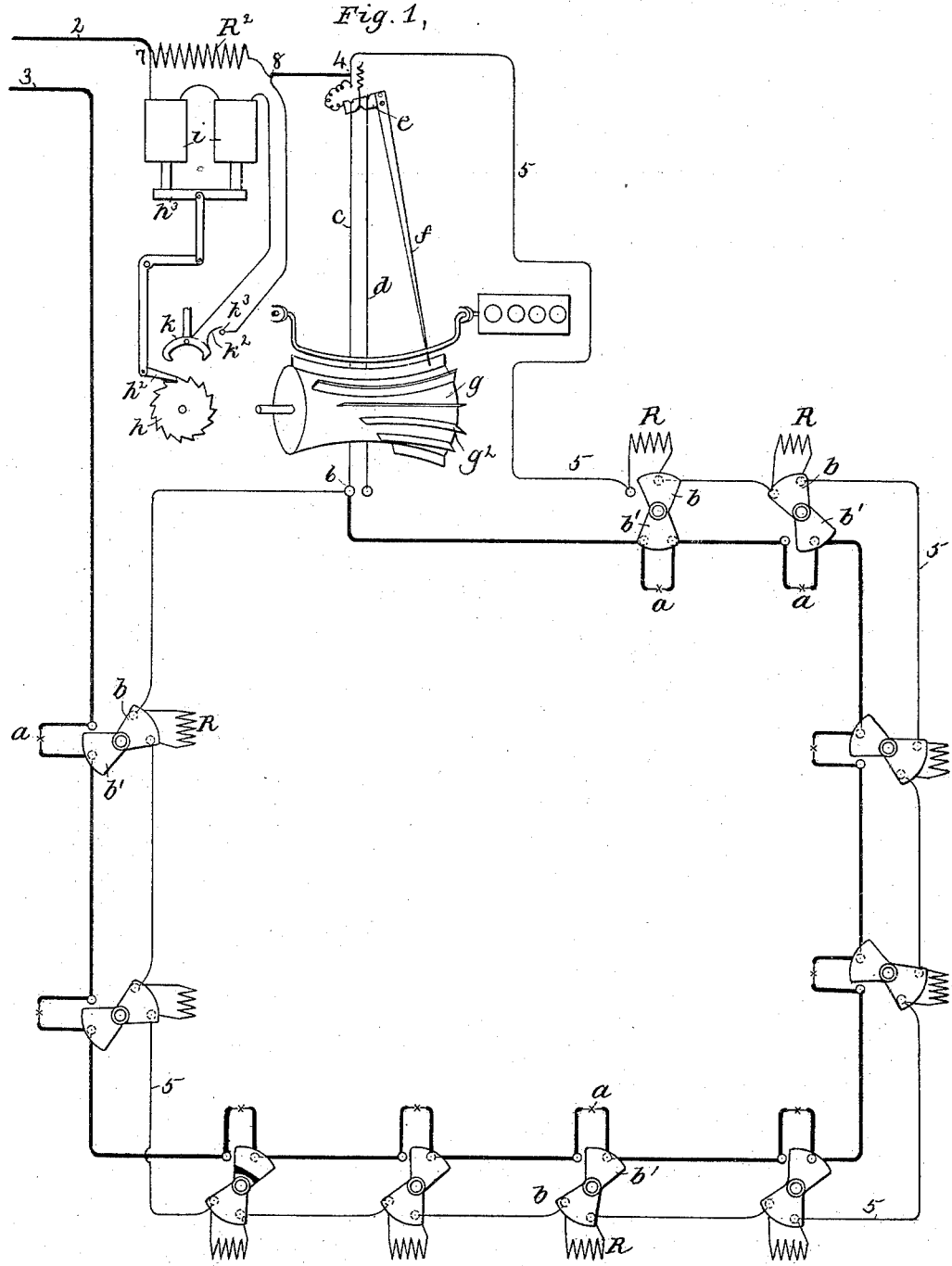

(No Model.)

H. H. CUTLER.
METER FOR ELECTRIC TRANSLATING DEVICES.

No. 467,669. Patented Jan. 26, 1892.

Witnesses,
Jas. J. Maloney
M. E. Hill

Inventor,
Henry H. Cutler,
by Jos. P. Livermore
Att'y.

UNITED STATES PATENT OFFICE.

HENRY H. CUTLER, OF NEWTON, MASSACHUSETTS.

METER FOR ELECTRIC TRANSLATING DEVICES.

SPECIFICATION forming part of Letters Patent No. 467,669, dated January 26, 1892.

Application filed January 2, 1889. Serial No. 295,150. (No model.)

*To all whom it may concern:*

Be it known that I, HENRY H. CUTLER, of Newton, in the county of Middlesex and State of Massachusetts, have invented an Improvement in Meters for Electric Translating Devices, &c., of which the following description, in connection with the accompanying drawings, is a specification, like letters on the drawings representing like parts.
My invention relates to a meter for showing the aggregate of the product of the number of translating devices or other instruments into the time of operation of said devices during a given period of time; and the apparatus herein shown for the purpose of illustration of the invention is arranged to indicate the number of lamp-hours that the lamps of a given set of arc lamps have been used, although the apparatus is equally capable of indicating the product of time of operation into the number of instruments operated for any given set of instruments or machines, as the operation of the meter depends upon the movement of a switch or other device by which the lamp or instrument the time of operation of which is to be measured is thrown into and out of operation and not directly upon the condition of the current that operates the translating device itself. In order to accomplish this result in accordance with this invention, an auxiliary circuit is employed containing or co-operating with an electric meter and a number of electric switches or equivalent devices, each mechanically connected or otherwise dependent for their condition upon the operation of the starting and stopping device by which the apparatus the time of operation of which is to be measured is controlled. As shown in this instance, the auxiliary or meter circuit is extended in proximity to the circuit containing the arc lamps the time of operation of which is to be measured, and at each lamp said meter-circuit includes a definite amount of resistance, which may be shunted or removed from the circuit and restored therein by the act of stopping or starting the lamp, the switch that controls the said resistance in the meter-circuit being mechanically connected with the switch by which the lamp is thrown into and out of operation.

As shown in this instance, the meter-circuit is supplied with a substantially constant current, being a shunt or derived circuit from the main circuit that supplies the lamps, and the resistance corresponding or adjacent to each lamp is cut out of circuit when the lamp is set in operation. The sensitive part of the meter itself is in parallel with this shunt-circuit, so that the removal of resistance from the shunt or meter circuit causes less amount of current to pass through the sensitive part of the meter, and the amount of current passing through the meter thus varies with the number of lamps in operation, being greatest when no lamps are in operation and being the least when the total number of lamps are in operation. This relation might, if desired, be inverted, making the quantity of current that passes through the meter vary directly with the number of lamps in operation instead of inversely.

The meter when used as just described is caused to register or indicate a number varying inversely with the amount of current passing through it, and if, for example, the numbers or figures of the meter-indicator have as their unit the operation of a single lamp for six minutes the said meter-indicator would advance one figure every six minutes if affected by the maximum current, as would be the case when one lamp was burning, or would advance the register ten figures in six minutes if affected by the minimum amount of current, as would be the case if ten lamps were burning, assuming that the meter was made to register for a set of ten lamps.

The object of this inverted arrangement or that in which the meter gives the highest indication when affected by the smallest current will be hereinafter explained.

Figure 2:
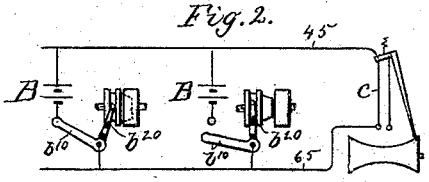

Figure 1 shows in diagram a sufficient portion of an electric meter and circuits co-operating therewith to illustrate this invention, and Fig. 2 a modification to be referred to.

The meter is herein shown as intended to indicate the aggregate of the product of the number of lamps burning into the length of time that each is burning for a number or set of arc lamps (indicated at *a*) arranged in series in a main circuit, the terminals of which with relation to the series of lamps and entire measuring apparatus are indicated at 2 and 3.

A set of lamps for which it is desirable to measure the lamp-hours of operation are usually grouped together, being, for example, located in one building, or in a yard or collection of buildings, and in order to measure the total number of lamp-hours of operation of the entire set there is, in accordance with the present invention, an auxiliary or meter circuit 4 5 6, arranged to pass in proximity to all the lamps. At each of the lamps or other devices the time of operation of which is to be measured the said meter-circuit 4 5 6 contains a definite amount of resistance R and a switch $b$, by which the terminals of said resistance may be connected directly together, so as to shunt the same or remove it from the circuit 4 5 6, or the said short connection between the terminals may be removed, so that the resistance is included in the meter-circuit. The said switch $b$ is mechanically connected with or forms a part of the starting and stopping device $b'$, by which the lamps or other devices the time of operation of which is to be measured, are thrown into and out of operation the said starting device being shown in this instance as a switch which, according to its position, does or does not make a direct connection between the terminals of the lamp outside the carbons, so as to shunt the said carbons or throw them into circuit, and, as shown in this instance, the connected switch $b$ and starting device $b'$ are so arranged that when the lamp is in operation the resistance R is out of the meter-circuit, and when the lamp is out of operation the resistance is included in the meter circuit; but it is obvious that this arrangement may be reversed, it being necessary only to make a definite change in the condition of the meter-circuit whenever any one lamp is thrown into operation and to make the reverse change of condition when a lamp is thrown out of operation, and as the resistance is the same at each lamp it follows that successive equal increments or decrements are made in the amount of resistance as the several switches are operated, it making no difference in what order the said switches are operated.

For convenience the apparatus the time of operation of which is to be measured will hereinafter be spoken of merely as a "lamp;" but it is obvious that any other instrument or machine might be substituted—such, for example, as an electromotor or, in fact, a mechanical motor, or a mechanically-operated machine—it being necessary only that the switch $b$ should be connected with or under control of the switch, clutch, belt-shipper, valve, handle, or starting and stopping device, whatever it may be, by which each machine or instrument is thown into and out of operation.

It is obvious that the circuit 4 5 6 might be a closed circuit, including a battery or other means for generating a substantially constant electro-motive force, so that the current in said circuit would vary as the resistance of said circuit was varied by cutting out and in the different resistances R, and consequently any form of current-meter included in said circuit would indicate or register different amounts of current in a period of time depending on the aggregate length of time that the several resistances R were in or out of circuit, and the portion of my invention thus far described is not limited to any one specific form of electric meter to register or indicate the condition of the meter-circuit, nor to any one specific way of supplying the current to said circuit, but consists in the employment, in connection with the lamps or other machines, of an auxiliary or measuring circuit and resistance in said circuit at each of the lamps or machines, which resistance is controlled by the starting and stopping of said lamp or machine, and thus afford means for making measurement of the time of operation of said lamp or machine.

When employed for indicating for arc lamps, it is probably best to use a meter substantially the same as that forming the subject of Letters Patent No. 397,538, granted to me February 12, 1889, to which reference may be had for a detailed description of the construction of the meter. A sufficient portion of said meter is, however, indicated in the diagram to illustrate the relation of said meter to the meter-circuit 4 5 6 and to the main circuit 2 3, that supplies the lamps, and in this instance also supplies the current for operating the meter. The said meter comprises a wire $c$, which constitutes the ammeter or sensitive part of the meter, being traversed by a variable current, the variations of which depend upon the condition of the instruments the time of operation of which is to be measured, and is heated and caused to expand a greater or less amount, according as a greater or less quantity of current passes through it. The indications of the meter depend upon expansion of said wire $c$ by the current relative to a wire $d$, which is similar to the wire $c$, and thus exposed to the same atmospheric changes, but is not traversed by any current, so that the lengthening of the wire $c$ relative to the wire $d$ is due wholly to heating by the current passing through the said wire $c$. The said wires $c\,d$ are connected with the two arms of a lever $e$, fulcrumed between them, so that a change of length of the wire $c$ relative to that of the wire $d$ causes the lever to turn on its fulcrum, and said lever carries a pointer $f$, the end of which in said rocking movement of the lever passes along the side of a drum $g$, which is rotated with substantially uniform speed by a clock-work or any other motor capable of giving such uniform rotation. The said drum $g$ is provided with radial blades or wings $g^2$, which are of different lengths, so that a greater or less number of said wings strike the end of the pointer $f$ in each rotation of the drum, according as the said pointer is in one or another position lengthwise of the drum.

In the illustration shown, when the apparatus is intended to indicate for ten lamps the drum has ten blades, and the successive changes in the meter-circuit moves the pointer ten distinct steps lengthwise of the drum, or into positions in which it is acted upon by one, two, three, &c., up to the entire ten of the blades $g^2$ during each rotation of the drum. Any convenient counting apparatus may be employed to indicate the number of lateral vibrations of the pointer $f$ during any given period of time, and such total number will depend upon the varying conditions of the meter-circuit and the length of time during which each condition is maintained.

In the present case, as in my former application, the drum is actuated by an electric clock or motor which operates only while the current is supplied to the lamps, the said motor comprising a ratchet-wheel $h$, the shaft of which is connected directly or through suitable gearing with the shaft of the drum $g$, which ratchet $h$ is operated by a pawl $h^2$, actuated by the armature $h^3$ of an electro-magnet $i$, the circuit of which magnet is controlled by the time-governor or escapement-anchor $k$ of the train of wheel-work actuated by the armature $h^3$ through the ratchet and pawl, so that said armature vibrates or advances the ratchet one step at definite time-intervals, determined by the oscillation of the balance or governor of the escapement.

The circuits are as follows: The main circuit entering at 2 divides at the point 7, one branch including the resistance $R^2$ and the other branch including the motor-magnet $i$ and circuit-closer $k^2$ $k^3$, controlling the said branch containing the magnet, and thus causing the magnet to be energized intermittingly, as before stated. Both said branches unite at 8, and the main circuit is continued to the point 4, where it again branches, one portion forming the meter-circuit 4 5 6 and the other portion including the sensitive part or wire $c$ of the meter proper. These two branches unite at the point 6, from which the main circuit extends through the lamps $a$ in series with one another.

The measuring apparatus is in two parallel branches of the main circuit and does not materially increase the resistance of the main circuit and does not withdraw any of the current from the lamps $a$.

The sensitive part $c$ of the meter being in multiple arc with the meter-circuit 4 5 6, it follows that the more resistance there is in the said meter-circuit the larger portion of current will have to pass through the sensitive device, and as the resistance is removed from the meter-circuit the current will be withdrawn from the sensitive part of the meter itself.

As the resistance is removed from the meter-circuit when the lights are thrown into operation, it follows that the sensitive part of the meter receives the maximum current when the fewest lights are in operation, or, in fact, when all the lights are extinguished, and receives the minimum current when all the lights are in operation, and consequently, in order that the counting apparatus shall represent the product of the number of lights burning into the time of burning, the pointer $f$ will have to make the greatest number of vibrations when the sensitive part $c$ receives the least current, and the reverse, and the blades $g^2$ of the drum $g$ are so disposed as to produce such movements of the pointer $f$.

The reason for the inversion—that is, for making the sensitive part of the meter receive the least current when it is to give the largest indication—is as follows: With the amount of current commonly employed in the meter the latter is in its most sensitive condition when the greatest amount of current is passing through it, and will thus respond more readily to an increment or decrement in a current of large amount than to the same increment or decrement in a current of small amount. The resistance of the meter-circuit 4 5 6 outside the resistance R is small, and is of course constant, and for the purpose of illustration it may be assumed that the resistance of that circuit is directly proportional to the number of resistances R that may be in circuit at any given time. As such resistances must necessarily be equal in order that the indications may be the same whichever ones of the entire series of lamps may be in operation, it follows that when all ten resistances are in circuit the removal of one will make a change amounting only to one-tenth of the current then flowing through said circuit, while if all the resistances but two were cut out the removal of one of these would make a change equal to one-half the current at that time flowing—that is, the changes become relatively greater the fewer the number of resistances in circuit—and as the relative change is smallest when all the resistances are in circuit it follows that the meter should be at its most sensitive condition at such time, a result which is attained by having the greatest amount of current pass through the sensitive part of the meter at such time.

The operation of the apparatus is as follows: Assuming that the drum $g$ turns once in six minutes or ten times an hour, then the number 10 on the counter will represent one lamp-hour, it making no difference whether ten lamps were burned for six minutes, five lamps for twelve minutes, or a single lamp for the whole hour, and so on. Assuming that the current is applied to the main leads 2 3, but that all the lamps $a$ are cut out, then all the resistances R will be included in the meter-circuit, and the wire $c$ will receive the maximum current and will expand the maximum amount, carrying the pointer $f$ so that its end is beyond the left-hand end of the drum, or at least beyond the end of the longest blade $g^2$, so that said drum will rotate without any of its blades engaging the pointer $f$, which will thus make no lateral movements and will not affect the counting apparatus. If now one lamp is set in operation, the corresponding resistance R will be cut out of meter-circuit, so that a larger portion of the current will pass through the meter-circuit, and the wire $c$ will receive about one-tenth less current than before. The said wire will therefore contract and the pointer $f$ will be carried thereby just to that point over the left-hand end of the drum at which it will be engaged by the longest blade $g^2$ once at each rotation of the drum $g$, thus making one count for every six minutes, ten such counts representing a lamp-hour, as before stated. If another lamp be now thrown into circuit, another portion of the resistance will be cut out and the current again reduced in the wire $c$, moving the pointer $f$ one step farther to the right, so that now it will be struck by two blades at each rotation of the drum $g$, adding two on the counting apparatus at each rotation of the drum, and so on, until finally, when all the lamps are in circuit and all the resistance removed from the motor-circuit, the wire $c$ will receive only a small portion of the current, will be slightly expanded, and the pointer will be in such a position near the right-hand end of the drum as to be struck by all ten of the blades at each rotation, thus adding ten to the count every six minutes. The indicator for the counting apparatus will thus show a number which will either represent directly the number of lamp-hours that the entire lamps of the series have been used, or will be a number from which the lamp-hours will be readily computed.

The blades $g^2$ may be properly set to correspond to the several step-advances of the pointer $f$, produced by the successive removals of resistance, as such step-advances are not necessarily of uniform length. The positions of the pointer, however, will always be the same when a constant current is supplied at the branching-point 4 for the same number of resistances in circuit, so that each position may be determined once for all by experiment and the blades $g^2$ set accordingly.

It is not essential that the current flowing through the meter should be varied by the introduction and removal of resistance, as any other means for adding to or decreasing the quantity of current passing through the sensitive part of the meter might be employed—as, for example, by adding or removing batteries or other generators arranged to vary the quantity instead of the electro-motive force of the electric current, as shown in Fig. 2.

As represented in Fig. 2, the meter-circuit and meter are employed for indicating the time of operation of apparatus, which is not in any way affected by the current that operates in the meter-circuit. In the construction there illustrated the sensitive part $c$ of the meter is included in circuit between main leads or conductors 45 65, which extend in proximity to the apparatus or machines the time of operation of which is to be measured, at each of which is a branch by which a battery B or equivalent source of electricity may be thrown into or out of circuit between the said main leads, the said switch $b^{10}$ for throwing such batteries into and out of circuit being connected with or forming part of the starting and stopping device $b^{20}$, that controls the operation of the machine, which is shown in this instance as a clutch-shipper. The sources of electric current are thus placed in multiple arc in the circuit of the meter, so that the quantity of current passing through the meter varies with the number of machines in operation, in this case increasing as the said number increases, and the reverse.

It is obvious that the herein-described arrangement of circuits and instruments does not depend for its operation upon any specific construction of the ammeter proper or sensitive device, (herein shown as a wire $c$,) but that any suitable or usual ammeter may be employed, it being essential only that the instrument should be responsive to changes in quantity of current, so as to produce different indications for different quantities of current being measured.

I claim—

1. An apparatus for indicating the time of operation of a number of instruments, machines, or electric translating devices, said apparatus comprising an electric circuit and an ammeter responsive to variations in the quantity of the current in said circuit, and electric switches or circuit-changers at each of said instruments the time of operation of which is to be measured, each connected to be operated in unison with the starting and stopping device for the corresponding instrument, and means at each of said switches by which the amount of current passing through the said ammeter is varied when each of said switches is operated, substantially as described.

2. The combination of a main circuit and set of translating devices connected in series therein with an electric meter and meter-circuit connected with said main circuit, and a meter comprising a sensitive part in multiple arc with said meter-circuit and responsive to variations in the quantity of current passing through it, and also comprising an indicator for showing the aggregate quantity of current that has passed during any interval of time and resistance in said meter-circuit corresponding to each of the translating devices in the main circuit, and switches or circuit-changing devices corresponding to each of said translating devices and co-operating with said meter-circuit, as set forth, whereby the movement of a switch that throws a translating device into or out of operation in the main circuit produces a corresponding change in the resistance in the meter-circuit and consequent change in the amount of current that passes through the sensitive part of the meter, substantially as described.

In testimony whereof I have signed my name to this specification in the presence of two subscribing witnesses.

HENRY H. CUTLER.

Witnesses:
    JOS. P. LIVERMORE,
    JAS. J. MALONEY.